US009696884B2

(12) United States Patent
Lehtiniemi et al.

(10) Patent No.: US 9,696,884 B2
(45) Date of Patent: Jul. 4, 2017

(54) METHOD AND APPARATUS FOR GENERATING PERSONALIZED MEDIA STREAMS

(75) Inventors: Arto Juhani Lehtiniemi, Lempaala (FI); Juha Henrik Arrasvuori, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 324 days.

(21) Appl. No.: 13/455,803

(22) Filed: Apr. 25, 2012

(65) Prior Publication Data

US 2013/0290843 A1   Oct. 31, 2013

(51) Int. Cl.
G06F 3/00       (2006.01)
G06F 3/0484     (2013.01)
G11B 19/02      (2006.01)
G06F 3/01       (2006.01)

(52) U.S. Cl.
CPC ........ *G06F 3/04842* (2013.01); *G11B 19/025* (2013.01)

(58) Field of Classification Search
CPC ... G11B 27/34; G06F 3/04815; G06F 3/0482; G06F 3/0481
USPC ....................................................... 715/716
See application file for complete search history.

(56) References Cited

U.S. PATENT DOCUMENTS

| | | | |
|---|---|---|---|
| 7,612,275 B2 | 11/2009 | Seppänen et al. | |
| 7,742,609 B2 | 6/2010 | Yeakel et al. | |
| 8,010,692 B1 | 8/2011 | Shanson et al. | |
| 8,862,255 B2* | 10/2014 | Story | 700/94 |
| 9,183,887 B2* | 11/2015 | Barry | G11B 27/031 |
| 9,230,527 B2* | 1/2016 | Bowen | A63B 71/0686 |
| 2005/0188403 A1 | 8/2005 | Kotzin | |
| 2006/0112335 A1 | 5/2006 | Hofmeister et al. | |
| 2007/0162933 A1 | 7/2007 | Hays et al. | |
| 2007/0226607 A1* | 9/2007 | Sakai | 715/513 |
| 2008/0049943 A1* | 2/2008 | Faller | G10L 19/008 381/17 |

(Continued)

FOREIGN PATENT DOCUMENTS

| | | |
|---|---|---|
| WO | 2007/106185 A2 | 9/2007 |
| WO | 2009/137206 A2 | 11/2009 |
| WO | 2011/103498 A2 | 8/2011 |

OTHER PUBLICATIONS

International Search Report for related International Patent Application No. PCT/FI2013/050301 dated Jun. 13, 2013, 5 pages.

(Continued)

*Primary Examiner* — Toan Vu
(74) *Attorney, Agent, or Firm* — Ditthavong & Steiner, P.C.

(57) ABSTRACT

An approach is provided for mixing at least one additional element on top of a media stream. A mix media platform determines at least a first media item for rendering in a first application. The mix media platform next determines one or more interactions with at least one connecting user interface element to associate a first representation of the first media item with a second representation of one or more media sources of a second application. The mix media platform then causes, at least in part, a mixing of the first media item and at least a portion of one or more second media items associated with the one or more media sources to cause, at least in part, a generation of a mix item.

18 Claims, 10 Drawing Sheets

(56) References Cited

U.S. PATENT DOCUMENTS

| | | | |
|---|---|---|---|
| 2008/0066007 A1* | 3/2008 | Lau et al. | 715/783 |
| 2008/0190269 A1* | 8/2008 | Eom | G10H 1/0008 84/611 |
| 2008/0314232 A1* | 12/2008 | Hansson et al. | 84/625 |
| 2009/0048694 A1* | 2/2009 | Matsuda et al. | 700/94 |
| 2009/0049379 A1 | 2/2009 | Trevor et al. | |
| 2009/0063975 A1* | 3/2009 | Bull et al. | 715/716 |
| 2009/0164902 A1* | 6/2009 | Cohen et al. | 715/716 |
| 2009/0223352 A1* | 9/2009 | Matsuda et al. | 84/612 |
| 2009/0272253 A1* | 11/2009 | Yamashita et al. | 84/611 |
| 2010/0122183 A1* | 5/2010 | Babaian et al. | 715/752 |
| 2010/0131527 A1* | 5/2010 | Wohlert | G06F 17/30053 707/758 |
| 2010/0182265 A1* | 7/2010 | Kim | G06F 1/1616 345/173 |
| 2010/0186579 A1* | 7/2010 | Schnitman | G10H 1/0025 84/625 |
| 2010/0281385 A1* | 11/2010 | Meaney et al. | 715/731 |
| 2010/0293455 A1* | 11/2010 | Bloch | G10H 1/0025 715/255 |
| 2011/0029867 A1* | 2/2011 | Park | 715/702 |
| 2011/0066438 A1 | 3/2011 | Lindahl et al. | |
| 2011/0130200 A1* | 6/2011 | Terada | G06F 3/04847 463/31 |
| 2011/0131493 A1 | 6/2011 | Dahl | |
| 2011/0179943 A1* | 7/2011 | Bowen | 84/612 |
| 2011/0202866 A1* | 8/2011 | Huang et al. | 715/779 |
| 2011/0219307 A1* | 9/2011 | Mate et al. | 715/717 |
| 2011/0252322 A1* | 10/2011 | Roberts | 715/716 |
| 2011/0279311 A1* | 11/2011 | Hamano | 342/357.25 |
| 2011/0313889 A1* | 12/2011 | Cohen | 705/27.1 |
| 2011/0317851 A1* | 12/2011 | Hattori | 381/98 |
| 2012/0036115 A1* | 2/2012 | Horii et al. | 707/705 |
| 2012/0044179 A1* | 2/2012 | Hudson | 345/173 |
| 2012/0046954 A1* | 2/2012 | Lindahl et al. | 704/500 |
| 2012/0124486 A1* | 5/2012 | Robinson et al. | 715/753 |
| 2012/0254755 A1* | 10/2012 | Wohlert | 715/716 |
| 2013/0007618 A1* | 1/2013 | Dodson et al. | 715/716 |
| 2013/0008301 A1* | 1/2013 | Naik et al. | 84/636 |
| 2013/0054319 A1* | 2/2013 | Woods et al. | 705/14.4 |
| 2013/0124993 A1* | 5/2013 | Daisy | 715/716 |
| 2013/0167058 A1* | 6/2013 | LeVee | G06F 3/0482 715/768 |
| 2013/0238998 A1* | 9/2013 | Craine et al. | 715/716 |
| 2014/0195909 A1* | 7/2014 | Rothkopf | G11B 27/105 715/716 |
| 2015/0082171 A1* | 3/2015 | Moncavage et al. | 715/716 |
| 2015/0378503 A1* | 12/2015 | Seo | G06F 1/1641 345/173 |
| 2016/0110076 A1* | 4/2016 | Reeves | G06F 1/1641 715/761 |
| 2016/0188190 A1* | 6/2016 | Ricci | G06F 3/04847 715/745 |

OTHER PUBLICATIONS

Written Opinion for related International Patent Application No. PCT/FI2013/050301 dated Jun. 13, 2013, 8 pages.

A. Beach, et al., "Fusing Mobile, Sensor, and Social Data To Fully Enable Context-Aware Computing," Proceedings of the Eleventh Workshop on Mobile Computing Systems & Applications (HotMobile '10), Annapolis, Maryland, U.S.A., ACM, 2010, pp. 60-65.

CitySounds.fm Datasheet, Mar. 25, 2010 (retrieved on Jun. 10, 2013) <http://web.archive.org/web/20100325234718;http://citisounds.fm/iphone>.

Densitometry—Wikipedia, Encyclopedia, Dec. 19, 2011 (retrieved on Jun. 20, 2013) <http://en.wikipedia.org/w/index.php?title=Densitometry&oldid=466674398>.

N. Milic-Frayling, et al., "Exploring Personal Broadcast Channels for Rich Media Sharing in Close Relationships," Proceedings of the Seventh International Conference on Mobile and Ubiquitous Multimedia (MUM '08), Umeå, Sweden, ACM, 2008, pp. 23-30.

J. Yu, et al., "Understanding Mashup Development," IEEE Internet Computing, IEEE, Sep./Oct. 2008, vol. 12, No. 5, Sep. 9, 2008, pp. 44-52.

AudioRealism Bass Line Pro (ABL Pro), Remixsoft.com, pp. 1-3, retrieved from Internet on Sep. 11, 2012, http://www.remixsoft.com/download/audiorealism-bass-line-pro-abl-pro.html.

Jordi Bonada Sanjaume, "Audio Time-Scale Modification in the Context of Professional Audio Post-production" Research work for PhD Program Informàtica i Comunicació digital, pp. 1-84.

Parson, A., "How to Set up a Virtual Audio Cable", eHow.com, pp. 1-5, retrieved from Internet on Jan. 20, 2012, http://www.ehow.com/how_7616776_set-up-virtual-audio-cable.html.

Peeters, G. et al., "Simultaneous Beat and Downbeat-Tracking Using a Probabilistic Framework: Theory and Large-Scale Evaluation", Audio, Speech, and Language Processing, IEEE Transactions on, Issue Date: Aug. 2011, vol. 19 Issue:6, pp. 1-13.

Record Speaker Output, Code-it.com, pp. 1-16, reriieved from Internet on Jan. 20, 2012: http://www.code-it.com/record_speaker_output.htm.

Ryynänen, M. et al., "Automatic transcription of melody, bass line, and chords in polyphonic music", Computer Music Journal, 32:3, pp. 72-86. http://www.cs.tut.fi/sgn/arg/klap/ryynanen-cmj.pdf.

UrbanRemix, pp. 1-2, retrieved from Internet on Sep. 11, 2012, http://urbanremix.gatech.edu/.

* cited by examiner

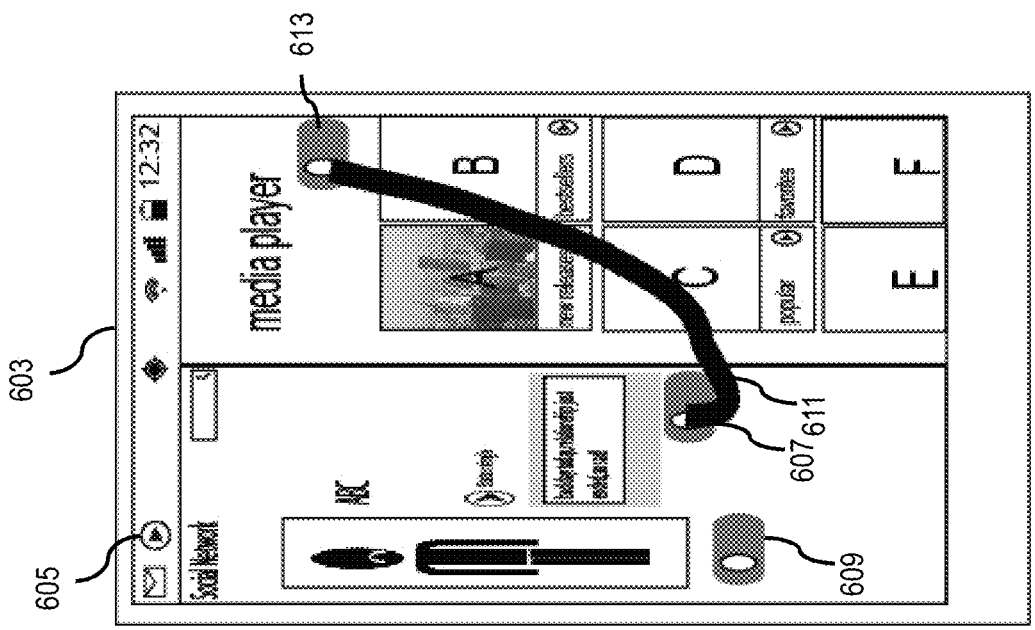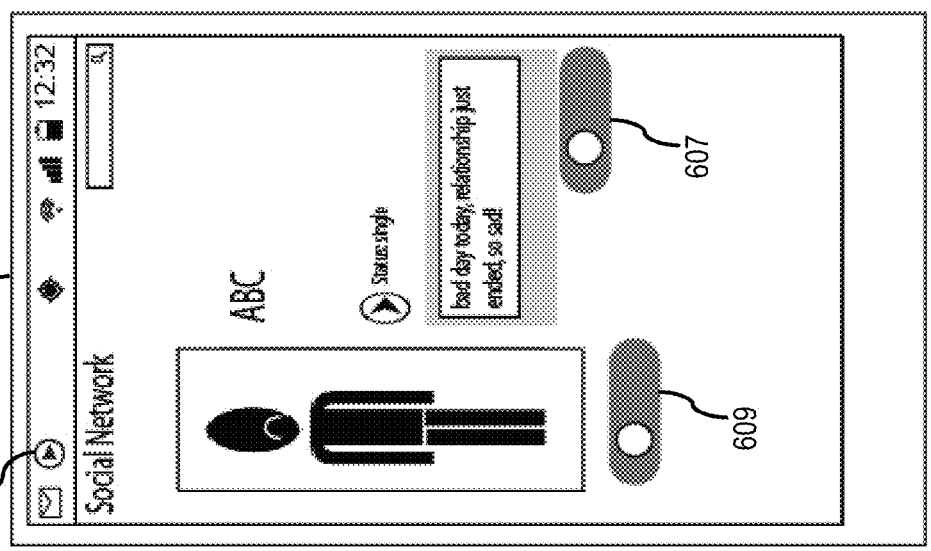
FIG. 6

METHOD AND APPARATUS FOR GENERATING PERSONALIZED MEDIA STREAMS

BACKGROUND

Service providers and device manufacturers (e.g., wireless, cellular, etc.) are continually challenged to deliver value and convenience to consumers by, for example, providing compelling network services. One area of interest has been the development of services and technologies related to streaming media (e.g., music, television, video, etc.) on mobile devices (e.g., mobile phones and/or tablets). For example, in recent years, services have offered users the ability to select various media streams related to different subject matters and genres (e.g., classical, rock, sports, news, amateur, etc.). However, users are unable to personalize the selected media stream. Accordingly, service providers and device manufacturers face significant technical challenges in providing a service that enables users to personalize the media stream based on their respective tastes and preferences.

SOME EXAMPLE EMBODIMENTS

Therefore, there is a need for an approach for mixing at least one additional element on top of a media stream.

According to one embodiment, a method comprises determining at least a first media item for rendering in a first application. The method also comprises determining one or more interactions with at least one connecting user interface element to associate a first representation of the first media item with a second representation of one or more media sources of a second application. The method further comprises causing, at least in part, a mixing of the first item and at least a portion of one or more second media items associated with the one or more media sources to cause, at least in part, a generation of a mix item.

According to another embodiment, an apparatus comprises at least one processor, and at least one memory including computer program code for one or more computer programs, the at least one memory and the computer program code configured to, with the at least one processor, cause, at least in part, the apparatus to determine at least a first media item for rendering in a first application. The apparatus is also caused to determine one or more interactions with at least one connecting user interface element to associate a first representation of the first media item with a second representation of one or more media sources of a second application. The apparatus is further caused to cause, at least in part, a mixing of the first item and at least a portion of one or more second media items associated with the one or more media sources to cause, at least in part, a generation of a mix item.

According to another embodiment, a computer-readable storage medium carries one or more sequences of one or more instructions which, when executed by one or more processors, cause, at least in part, an apparatus to determine at least a first media item for rendering in a first application. The apparatus is also caused to determine one or more interactions with at least one connecting user interface element to associate a first representation of the first media item with a second representation of one or more media sources of a second application. The apparatus is further caused to cause, at least in part, a mixing of the first item and at least a portion of one or more second media items associated with the one or more media sources to cause, at least in part, a generation of a mix item.

According to another embodiment, an apparatus comprises means for determining at least a first media item for rendering in a first application. The apparatus also comprises means for determining one or more interactions with at least one connecting user interface element to associate a first representation of the first media item with a second representation of one or more media sources of a second application. The apparatus further comprises means for causing, at least in part, a mixing of the first item and at least a portion of one or more second media items associated with the one or more media sources to cause, at least in part, a generation of a mix item.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 are diagrams of user interfaces utilized in the alternative processes of FIGS. 3 and 4, according to various embodiments;

DESCRIPTION OF SOME EMBODIMENTS

Examples of a method, apparatus, and computer program for mixing at least one additional element on top of a media stream are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
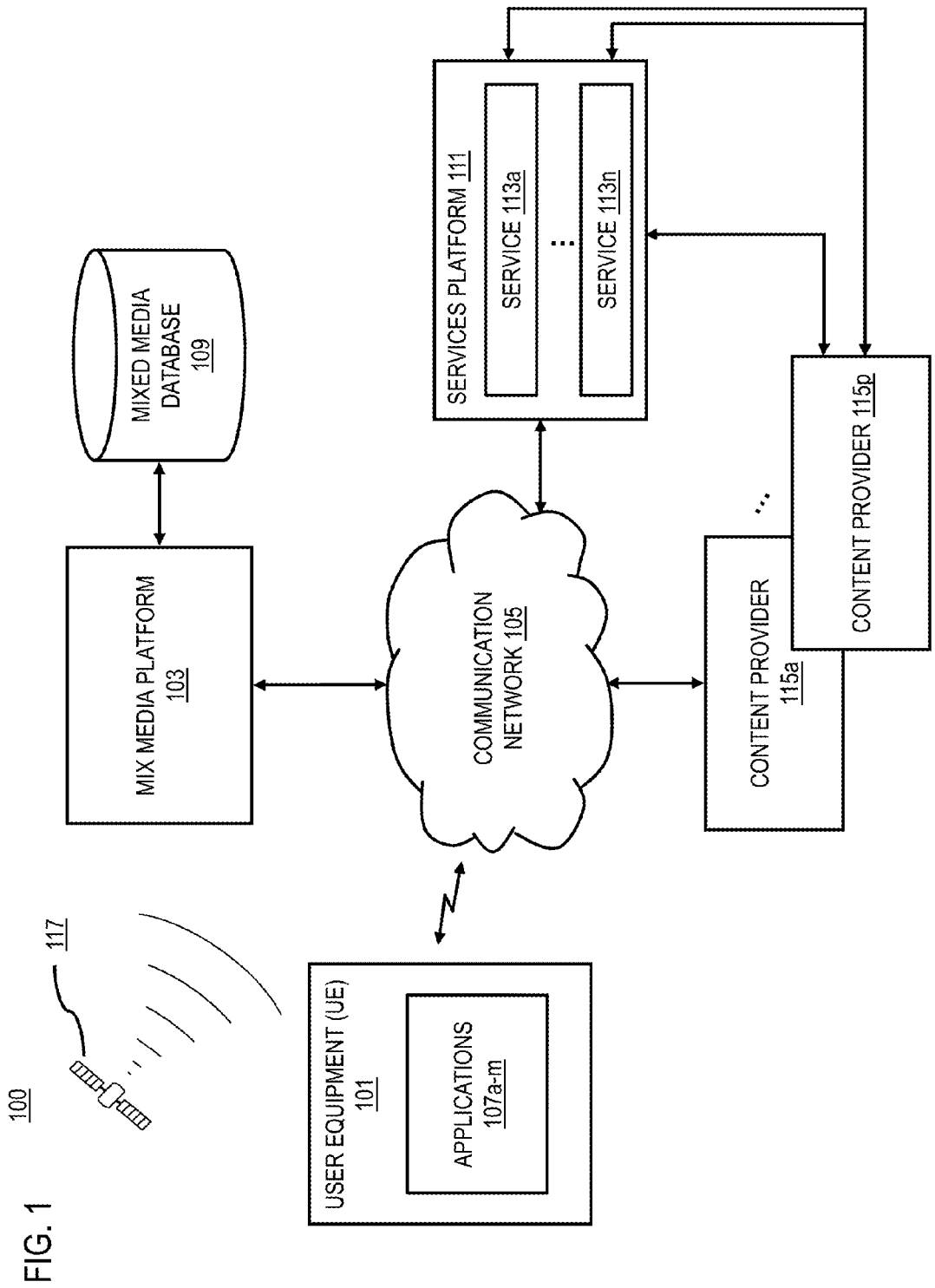
FIG. 1 is a diagram of a system capable of mixing at least one additional element on top of a media stream, according to one embodiment.

FIG. 1 is a diagram of a system capable of mixing at least one additional element on top of a media stream, according to one embodiment. As previously discussed, one area of interest among service providers and device manufactures has been the development of services and technologies related to streaming media (e.g., music, television, video, etc.) on mobile devices (e.g., mobile phones and/or tablets). For example, in recent years, services have offered users the ability to select various media streams related to different subject matters and genres (e.g., classical, rock, sports, news, amateur, etc.). However, users are unable to personalize the selected media stream.

To address this problem, a system 100 of FIG. 1 introduces the capability of mixing at least one additional element on top of a media stream. In one embodiment, the system 100 first determines at least a first media item (e.g., a music playlist or Internet media stream) for rendering in a first application (e.g., a media player application). By way of example, an end user may activate a media player on his or her mobile device (e.g., a mobile phone or tablet) in order to listen to a particular media stream (e.g., east coast hip hop). While the media player is still running, the user navigates away from the media player and starts a second application on his or her mobile device (e.g., a mapping and/or navigation application). By way of example, the end user may be interested in the origins of the music he or she is listening to and therefore wants to examine a map of a portion of New York City (e.g., Harlem). In one embodiment, the system 100 next determines one or more interactions with at least one connecting user interface element (e.g., a virtual cable) to associate a first representation of the first media item (e.g., the music stream) with a second representation of one or more media sources of a second application (e.g., the map of Harlem). More specifically, when the system 100 determines one or more interactions with one or more patch bays (i.e., an input or an output) associated with the second application, the system 100 causes, at least in part, a rendering of a virtual cable and at least one patch bay associated with the first application so as to enable a connection of the first and second applications. It is contemplated that the one or more patch bays may function as a new type of user interface (UI) widget. It is further contemplated that the patch bay associated with the first media item of the first application and the one or more patch bays associated with the one or more media sources of the second application are connected by the virtual cable in a manner similar to patching circuits in a patch bay found in a recording and/or production studio.

In one embodiment, the system 100 then processes the one or more interactions, the one or more media sources (e.g., the map of Harlem), or a combination thereof to cause an identification, a retrieval, or a combination thereof of the one or more second media items (e.g., one or more drum loops, one or more audio samples, one or more virtual instruments, etc.). More specifically, as a result of the association of the first and second applications via the virtual cable, the system 100 determines a notification of the connection from the second application, which contains the global positioning system (GPS) coordinates of the location to which the virtual cable is connected to (e.g., Harlem) and an address of a server (e.g., a server associated with the one or more content provisioning services) where the one or more second media items (e.g., a drum loop) may be requested using the GPS coordinates of Harlem as a selection parameter. It is contemplated that regardless of the type of the second application, the system 100 can determine the one or more selection parameters based, at least in part, on the location of the one or more patch bays associated with the second application.

In one embodiment, the system 100 next causes a mixing of the first media item and at least a portion of the one or more second media items (e.g., a drum loop) to cause a generation of a mix item. More specifically, the system 100 mixes the at least first media item and the one or more second media items based, at least in part, on one or more beat matching, one or more tempo matching, one or more rhythm matching, or a combination thereof processes. By way of example, the system 100 may mix the media items based on beat and downbeat analysis methods such that the drum loop is (1) subjected to time scale modification to make the drum loop tempo match the tempo of the active first media item and (2) time-aligned such that the first beat of each measure of the drum loop is matched to a downbeat of the first media item. The system 100 then renders the mix item as a personalized media stream in the mobile device of a user so that the user hears the Harlem drum loop mixed on top of the east coast hip hop media stream. As a result, the system 100 enables the user to be his or her Disc Jockey (DJ).

In certain embodiments, once the system 100 generates and renders the personalized media stream, the system 100 may determine one or more other interactions with (a) one or more controls (e.g., a volume knob), one or more parameters (e.g., repeat, shuffle, etc.), or a combination thereof associated with the first application (e.g., a media player); (b) the at least one connecting user interface element (e.g., a virtual cable); or (c) a combination thereof to cause one or more modifications of the one or more renderings of the mix item. In one example use case, the system 100 may cause, at least in part, a rendering of one or more volume knobs associated with the media player, the one or more patch bays, or a combination thereof. The system 100 can then process one or more manipulations of the one or more volume knobs to determine an input level of the one or more second media items (e.g., a drum loop) being mixed by the system 100 with the first media item (e.g., a music stream). In addition, the system 100 can enable the end user to make multiple connections between the first application (e.g., a media player) and the one or more second media items (e.g., a drum loop). However, if for example, the user simultaneously connects two drum loops to the media player, the system 100 may alternate the drum loops between one or more first media items (e.g., adjacent songs in a playlist) since it may not make sense to mix the two drum loops on top of each other. Alternatively, the system 100 may decide to make a combination of the two drum loops, for example, to pick certain sounds from one drum loop and other sounds from the second drum loop. For example, the snare drum and hi-hat samples might be selected from the first drum loop and used to replace the snare drum and hi-hat samples of the second drum loop.

In one embodiment, the system 100 may also determine to store, to share, or a combination thereof the one or more personalized mix items. As a result, the system 100 can enable one or more other users to view, to listen, to rate, to comment on, etc. the one or more mix items. In one embodiment, the system 100 can store, share, or a combination thereof the one or more mix items based, at least in part, on one or more predetermined parameters (e.g., most popular, funniest, etc.). In addition, the system 100 may determine to associate (i.e., make available) the one or more mix items (e.g., the most popular) with one or more media streams, the first application (e.g., a media player), or a combination thereof. As a result, in one example use case, the system 100 can automatically make available the best and/or funniest mix items to the media player for easy consumption.

In certain embodiments, wherein the second application is a location-based application (e.g., a mapping and/or navigation application), the system 100 determines the one or more media sources, the one or more second media items, or a combination thereof based on one or more geographic areas depicted within the location-based application. As previously discussed, the system 100 can determine the one or more second media items based, at least in part, on the GPS coordinates of a particular area (e.g., Harlem, Paris, Tokyo, etc.). More specifically, it is contemplated that the one or more second media items would have at least one recognizable and/or well-known association with a particular region (e.g., popularity in that area or region).

In certain embodiments, wherein the second application is a social networking application (e.g., Facebook®), the system 100 first determines at least one social networking status associated with one or more users of the social networking application (e.g., a user's friend). By way of example, the one or more statuses may include various types of input (e.g., text, mood, tags, images, etc.). In one embodiment, the system 100 then causes at least one conversion of the at least one social networking status into at least a portion of the one or more second media items. By way of example, the system 100 may synthesize text from a status update into singing using methods of singing synthesis, such as lyrics-to-singing synthesis (e.g., Songify®), and then mix the singing on top of a first media item (e.g., a music stream). As a result, a user would hear one or more of his or her friend's status updates sang along with the music stream. In addition to text, in certain embodiments, the system 100 can determine and select one or more media sources, one or more second media items (e.g., one or more virtual instruments), or a combination thereof based on the mood of a user of the social networking application (e.g., a sad mood). In one example use case, if the system 100 determines a sad mood, then the system 100 can select and mix chords in the minor key on top of the first media item (e.g., a music stream).

In certain embodiments, wherein the first media item includes one or more graphical elements (e.g., a video or television stream), the system 100 can process the one or more graphical elements (e.g., using one or more frame analysis methods) to determine one or more areas of minimal density within the one or more frames of the media. The system 100 can then cause a mixing of the first media item and at least a portion of one or more second media items (e.g., one or more other images) based on the one or more areas of minimal density (i.e., so that the one or more other images do not mask interesting objects already in the video or television stream).

In one embodiment, wherein the one or more second media items includes, at least in part, text, the system 100 can cause, at least in part, a generation of the mix item based on one or more additions of text, one or more supplementations with text, or a combination thereof on top of the first media item. In one example use case, the first media item may be pages of an electronic book and the one or more second media items may be associated with a word processing application. As a result, the system 100 may determine to select text (e.g., a poem) from the word processing application, one or more databases, or a combination thereof in order to generate a personalized mix item comprising the poem interleaved into the pages of the electronic book. In another example use case, the first media item may be a media stream (e.g., a video or television stream) and the one or more second media items may be associated with text (e.g., lyrics of a song, lines of a movie, etc.). As a result, the system 100 may determine to mix the lyrics of a song or lines of a movie with the media stream (e.g., as subtitles) in order to generate a personalized media stream.

Further, in certain embodiments, wherein the second application is an organizational application (e.g., a calendar application), the system 100 can determine the one or more media sources, the one or more second media items, or a combination thereof based on one or more calendar dates, one or more contacts, or a combination thereof. For example, a user may navigate away from the active media player running on his or her mobile device in order to browse a calendar application for dates of holidays (e.g., Christmas). The system 100 can then determine to select one or more media sources, one or more second media items, or a combination thereof based on one or more Christmas themes and then mix the one or more second media items (e.g., sleigh bells) on top of the music stream to generate a personalized media stream.

As shown in FIG. 1, the system 100 comprises a user equipment (UE) 101 (e.g., a mobile phone or tablet) having connectivity to a mix media platform 103 via a communication network 105. The UE 101 may include or have access to one or more applications 107a-107m (also collectively referred to as applications 107). By way of example, the applications 107 may include a media player application (e.g., a music, television, and/or video streaming application), a location-based application (e.g., a mapping and/or navigation application), a social networking application, an electronic book application, one or more organizational applications (e.g., a calendar, contacts, etc.), a web browser, a gaming application, etc. In certain embodiments, the applications 107 may also include one or more media mixing applications.

In one embodiment, the mix media platform 103 may include or be associated with at least one mix media database 109. The mix media platform 103 may exist in whole or in part within the UE 101, or independently and the mix media database 109 may exist in whole or in part within the mix media platform 103. The mix media database 109 may include one or more stored, shared, or a combination thereof personalized mix items. In addition, the mix media database 109 may also include metadata regarding one or more first media items associated and/or stored on the UE 101 (e.g., a music playlist) as well as one or more other images that can be mixed by the mix media platform 103 with one or more graphical elements (e.g., a video or television stream).

The UE 101 is also connected to a services platform 111 via the communication network 105. The services platform 111 includes one or more services 113a-113n (also collectively referred to as services 113). The services 113 may include a wide variety of services such as content provisioning services for the one or more applications 107 (e.g., location-based services, social networking services, Internet media streaming services, etc.). In addition, the UE 101 and the services platform 111 are also connected to one or more content providers 115a-115p (also collectively referred to as content providers 115) via the communication network 105. The content providers 115 also may provision a wide variety of content (e.g., one or more media streams, one or more second media items, etc.) to the components of the system 100.

In certain embodiments, the applications 107 may utilize location-based technologies (e.g., GPS, cellular triangulation, Assisted GPS (A-GPS), etc.) to make a request to one or more services 113 for location-based data (e.g., mapping and/or navigation information) based on a position relative to a UE 101. For example, the UE 101 may include a GPS receiver to obtain geographic coordinates from the satellites 117 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the mix media platform 103 first determines at least a first media item (e.g., a music playlist or Internet media stream) for rendering in a first application (e.g., a media player application). As previously discussed, in one example use case, an end user may activate an application 107 (e.g., a media player) on his or her UE 101 (e.g., a mobile phone) in order to listen to a particular media stream (e.g., east coast hip hop). While the media player is still running, the user navigates away from the media player and starts a second application 107 (e.g., a mapping and/or navigation application). By way of example, the end user may be interested in the origins of the music he or she is listening to and therefore want to examine a map of New York City (e.g., Harlem). In one embodiment, the mix media platform 103 next determines one or more interactions with at least one connecting user interface element (e.g., a virtual cable) to associate a first representation of the first media item (e.g., the music stream) with a second representation of one or more media sources of a second application 107 (e.g., a portion of a map of Harlem). More specifically, when the mix media platform 103 determines one or more interactions with one or more patch bays (i.e., an input or an output) associated with the second application 107, the mix media platform 103 causes, at least in part, a rendering of a virtual cable and at least one patch bay associated with the first application 107 so as to enable a connection of the first and second applications 107.

In one embodiment, the mix media platform 103 then processes the one or more interactions, the one or more media sources (e.g., the map of Harlem), or a combination thereof to cause an identification, a retrieval, or a combination thereof of the one or more second media items (e.g., one or more drum loops, one or more audio samples, one or more virtual instruments, etc.). More specifically, as a result of the association of the first and second applications 107 via the virtual cable, the mix media platform 103 determines a notification of the connection from the second application 107 (e.g., the mapping and/or navigation application), which contains the GPS coordinates of the location to which the virtual cable is connected (e.g., Harlem) and an address of a server (e.g., the services platform 111) where one or more second media items (e.g., a drum loop) can be requested using the GPS coordinates as a selection parameter. In response, one or more of the services 113 may provision the mix media platform 103 with the requested second media item (e.g., a drum loop popular in Harlem).

In one embodiment, the mix media platform 103 next causes a mixing of the first media item (e.g., the music stream) and at least a portion of the one or more second media items (e.g., the drum loop) to cause a generation of a personalized mix item. More specifically, the mix media platform 103, an application 107, or a combination thereof mixes the first and second media items based, at least in part, on one or more beat matching, one or more tempo matching, one or more rhythm matching, or a combination thereof processes. The mix media platform 103 then causes a rendering of the mix item as a personalized media stream in the first application 107 (e.g., media player) of the UE 101 (e.g., a mobile phone) so that the user hears the Harlem drum loop mixed on top of the east coast hip hop media stream.

In certain embodiments, once the mix media platform 103 generates and renders the personalized media stream, the mix media platform 103 may determine one or more other interactions with (a) one or more controls (e.g., a volume knob), one or more parameters (e.g., repeat, shuffle, etc.), or a combination thereof associated with the first application 107 (e.g., a media player); (b) at least one connecting user interface element (e.g., the virtual cable); or (c) a combination thereof to cause one or more modifications of the one or more renderings of the mix item. As previously discussed, in one example use case, the mix media platform 103 may cause, at least in part, a rendering of one or more volume knobs associated with the first application 107 (e.g., a media player), the one or more patch bays, or a combination thereof. The mix media platform 103 can then process one or more manipulations of the one or more volume knobs to determine an input level of the one or more second media items (e.g., the drum loop popular in Harlem) being mixed by the mix media platform 103 with the first media item (e.g., a music stream).

In one embodiment, the mix media platform 103 may also determine to store (e.g., in the mix media database 109), to share (e.g., via the services 113), or a combination thereof the one or more mix items. As a result, the mix media platform 103 can enable one or more other users to view, to listen, to rate, to comment on, etc. the one or more mix items. In one example use case, the mix media platform 103 can store, share, or a combination thereof the one or more mix items based, at least in part, on one more predetermined parameters (e.g., most popular, funniest, etc.). In addition, the mix media platform 103 may determine to associate (i.e., make available) the one or more mix items (e.g., the most popular) with one or more media streams, the first application (e.g., a media player), or a combination thereof. As a result, in one example use case, the mix media platform can automatically make available the best and/or funniest mix items to the media player for easy consumption.

In certain embodiments, wherein the second application is a location-based application (e.g., a mapping and/or navigation application), the mix media platform 103 determines the one or more media sources (e.g., a portion of a map), the one or more second media items (e.g., one or more drum loops, one or more audio samples, one or more virtual instruments, etc.), or a combination thereof based on one or more geographic areas depicted within the location-based application (e.g., Harlem). As previously discussed, the mix media platform 103 can determine the one or more second media items based, at least in part, on the GPS coordinates of a particular area (e.g., Harlem, Paris, Tokyo, etc.). More specifically, it is contemplated that the one or more second media items would have at least one recognizable or well-known association with a particular region (e.g., popularity in that area or region).

In certain embodiments, wherein the second application is a social networking application (e.g., Facebook®), the mix media platform 103 first determines at least one social networking status associated with one or more users of the social networking application (e.g., a user's friend). By way of example, the one or more statues may include various types of input (e.g., text, mood, text, images, etc.). In one embodiment, the mix media platform 103 then causes at least one conversion of the at least one social networking status into at least a portion of the one or more second media items. For example, the mix media platform 103 may synthesize text from a status update into singing using methods of singing synthesis, such as lyrics-to-singing synthesis (e.g., Songify®), and then mix the singing on top of a first media item (e.g., a music stream). As a result, a user would hear one or more of his or her friend's status updates sang along with the music stream. In addition to text, in certain embodiments, the mix media platform 103 can determine and select one or more media sources (e.g., the services 113), one or more second media items (e.g., one or more virtual instruments), or a combination thereof based on the mood of a user of the social networking application (e.g., a sad mood). In one example use case, if the mix media platform 103 determines a sad mood, then the mix media platform 103 can select and mix chords in the minor key on top of the first media item (e.g., a music stream).

As previously discussed, in certain embodiments, wherein the first media item includes one or more graphical elements (e.g., a video or television stream), the mix media platform 103 can process the one or more graphic elements (e.g., using one or more frame analysis methods) to determine one or more areas of minimal density within the one or more frames of the media. The mix media platform 103 can then cause the mixing of the first media item and at least a portion of one or more second media items (e.g., one or more other images) based on the one or more areas of minimal density (i.e., so that the one or more other images do not mask interesting objects already in the video or television stream).

In one embodiment, wherein the one or more second media items includes, at least in part, text, the mix media platform 103 can cause, at least in part, a generation of the mix item based on one or more additions of text, one or more supplementations with text, or a combination thereof on top of the first media item. In one example use case, the first media item may be pages of an electronic book and the one or more second media items may be associated with a word processing application. As a result, the mix media platform 103 may determine to select text (e.g., a poem) from the word processing application, the mix media database 109, or a combination thereof in order to generate a personalized mix item comprising the poem interleaved into the pages of the electronic book. In another example use case, the first media item may be a media stream (e.g., a video or television stream) and the one or more second media items may be associated with text (e.g., lyrics of a song, lines of a movie, etc.). Consequently, the mix media platform 103 may determine to mix the lyrics of a song or lines of a movie with the media stream (e.g., as subtitles) in order to generate a personalized media stream.

Further, in certain embodiments, wherein the second application is an organizational application (e.g., a calendar application), the mix media platform 103 can determine the one or more media sources, the one or more second media items, or a combination thereof based on one or more calendar dates, one or more contacts, or a combination thereof. By way of example, a user may navigate away from the active media player running on his or her mobile device in order to browse a calendar application for dates of holidays (e.g., Christmas). The mix media platform 103 can then determine to select one or more media sources (e.g., the services 113), one or more second media items (e.g., one or more virtual instruments), or a combination thereof based on one or more Christmas themes and then mix the one or more second media items (e.g., sleigh bells) on top of the music stream to generate a personalized media stream.

By way of example, the UE 101, mix media platform 103, the applications 107, the services platform 111, the services 113, the content provider 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
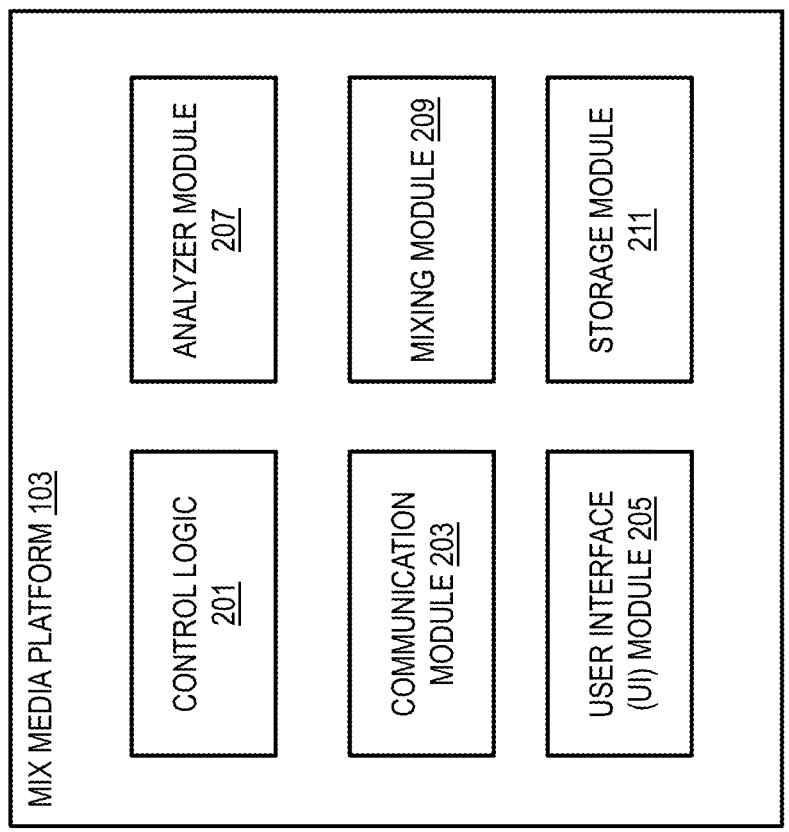
FIG. 2 is a diagram of the components of a mix media platform, according to one embodiment.

FIG. 2 is a diagram of the components of a mix media platform 103, according to one embodiment. By way of example, the mix media platform 103 includes one or more components for providing mixing at least one additional element on top of a media stream. It is contemplated that the functions of these components may be combined in one or more components or performed by other components of equivalent functionality. In this embodiment, the mix media platform 103 includes a control logic 201, a communication module 203, a user interface (UI) module 205, an analyzer module 207, a mixing module 209, and a storage module 211.

The control logic 201 oversees tasks, including tasks performed by the communication module 203, the user interface (UI) module 205, the analyzer module 207, the mixing module 209, and the storage module 211. For example, although other modules may perform the actual task, the control logic 201 may determine when and how those tasks are performed or otherwise direct the other modules to perform the task.

The communication module 203 is used for communication between the applications 107 of the UE 101 and the mix media platform 103. The communication module 203 is also used for communication between the applications 107 and the services 113 of the services platform 111, content providers 115, the mix media database 109, and the satellites 117. The communication module 203 may also be used to render the first media item (e.g., a music stream) in the first application (e.g., a media player) as well as the one or more personalized mix items. The communication module 203, in connection with the user interface module 205 and the storage module 211, also may be used to cause one or more associations of the stored, shared, or a combination thereof mix item with the first application (e.g., a media player). In certain embodiments wherein the second application is a location-based application, the communication module 203, in connection with the analyzer module 207, may also be used to request one or more second media items (e.g., a drum loop) based on GPS coordinates determined by the analyzer module 207. In certain embodiments where the second application is a social networking application, the communication module 203, in connection with the analyzer module 207, also may be used to request one or more second media items (e.g., chords in the minor key) associated with one or more moods (e.g., sad) of a user of the social networking application.

The user interface (UI) module 205 is used to determine a first media item (e.g., a music stream) in a first application (e.g., a media player application). More specifically, the user interface module 205 may be used to select and activate the first application as well as a second application. The user interface module 205 may also be used to determine one or more interactions with, one or more patch bays, at least one connecting user interface element (e.g., a virtual cable), or a combination thereof to associate a first representation of the first media item (e.g., a music stream) with a second representation of one or more media sources (e.g., a portion of a map) of a second application (e.g., a mapping and/or navigation application). More specifically, the user interface module 205 is used to determine one or more interactions with the one or more individual patch bays associated with the respective representations of the first application and the second application. As previously discussed, it is contemplated that the user interface module 205 enables the virtual cable to contact the respective patch bays in a manner similar to patching circuits in a patch bay found in a recording and/or production studio.

In certain embodiments, the user interface module 205, in connection with the communication module 203, may also be used to determine one or more other interactions with (a) one or more other controls (e.g., a volume knob), one or more parameters (e.g., repeat, shuffle, etc.), or a combination thereof associated with the first application (e.g., a media player); (b) the at least one connecting user interface element (e.g., a virtual cable); or a combination thereof to cause one or more modifications of the one or more renderings of the mix item. The user interface module 205, in connection with the communication module 203 and the storage module 211, also may be used to store (e.g., in the mix media database 109), to share (e.g., with the services 113), or a combination thereof the one or more personalized mix items.

The analyzer module 207, in connection with the user interface module 205, is used to process the one or more interactions, the one or more media sources (e.g., a portion of a map), or a combination thereof to cause, at least in part, an identification, a retrieval, or a combination thereof of the one or more second media items (e.g., one or more drum loops, one or more audio samples, one or more virtual instruments, etc.). By way of example, wherein the second application is a location-based application (e.g., a mapping and/or navigation application), the analyzer module 207 may be used to determine the GPS coordinates of the location within the mapping and/or navigation application that the virtual cable is connected to (e.g., Harlem). In certain embodiments, wherein the second application is a social networking application, the analyzer module 207 also may be used to determine at least one social networking status associated with one or more users of the social networking application. By way of example, the analyzer module 207 may analyze various types of input (e.g., text, mood, tags, images, etc.) in order to determine a mood of one or more users (e.g., sad) and one or more second media items commonly associated with that mood (e.g., chords in the minor key). In other embodiments, wherein the first media item (e.g., a media stream) includes, at least in part, one or more graphical elements (e.g., a video or television stream), the analyzer module 207 also may be used to process the one or more graphical elements (e.g., using one or more frame analysis methods) to determine one or more areas of minimal density within the one or more frames of media. Further, in certain embodiments, wherein the second application is an organizational application (e.g., a calendar application), the analyzer module 207 may also be used to determine one or more media sources (e.g., the services 113), the one or more second media items (e.g., one or more virtual instruments), or a combination thereof based on one or more calendar dates, one or more contacts, or a combination thereof. As previously discussed, wherein a user is browsing his or her calendar application for dates of holidays (e.g., Christmas), the analyzer module 207 may be used to determine the one or more media sources, the one or more second media items (e.g., sleigh bells), or a combination thereof based on one or more Christmas themes.

The mixing module 209 is used to mix the first media item (e.g., a music stream) and at least a portion of one or more second media items (e.g., one or more drum loops, one or more audio samples, one or more virtual instruments, etc.) associated with the one or more media sources (e.g., a portion of a map) to cause, at least in part, a generation of a personalized mix item. It is contemplated that the mixing module 209 may mix the media items based, at least in part, on one or more beat matching, one or more tempo matching, one or more rhythm matching, or a combination thereof processes. By way of example, the mixing module 209, in connection with the analysis module 207, may mix the media items based on beat and downbeat analysis methods such that the drum loop is (1) subjected to time-scale modification to make the drum loop tempo match the tempo of the active first media item and (2) time-aligned such that the first beat of each measure of the drum loop is matched to a downbeat of the first media item. In certain embodiments, wherein the second application is a social networking application, the mixing module 209, may also be used to convert the at least one social networking status into at least a portion of the one or more second media items. By way of example, the mixing module 209 may be used to synthesize text from a status update into singing using methods of singing synthesis, such as lyrics-to-singing synthesis (e.g., Songify®). In other embodiments, wherein the first media item includes, at least in part, one or more graphical elements, the mixing module 209 also may be used to mix the first media item (e.g., a video stream) and at least a portion of the one or more second media items (e.g., one or more other images) based, at least in part, on the one or more areas of minimal density as determined by the analyzer module 207. For example, the mixing module 209 may mix the media items in such a way that the one or more other images do not mask interesting objects already in the video or television stream. Further, in certain embodiments wherein the one or more second media items includes, at least in part, text, the mixing module 209 may also be used to cause one or more additions of text, one or more supplementations with text, or a combination thereof on top of the first media item (e.g., pages of an electronic book).

The storage module 211 is used to manage the storage of the one or more stored, shared, or a combination thereof personalized mix items, metadata regarding the one or more first media items (e.g., a music playlist) associated and/or stored on the mobile device rendering the one or more mix items (e.g., the UE 101), and one or more other images that can be mixed by the media platform 103 with one or more graphical elements (e.g., a video or television stream).

Figure 3:
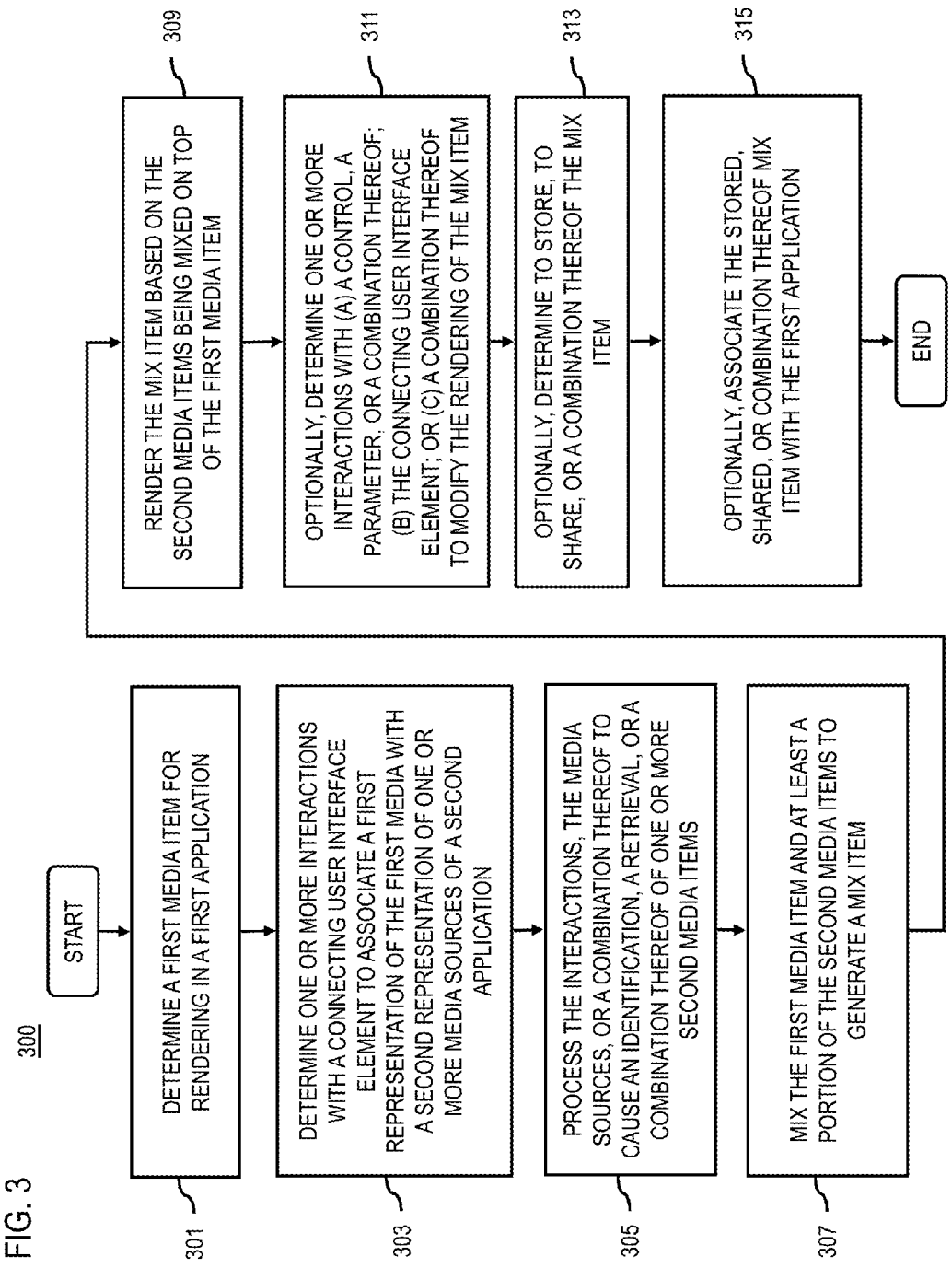
FIG. 3 is a flowchart of an exemplary process for mixing at least one additional element on top of a media stream, according to one embodiment.
Figure 8:
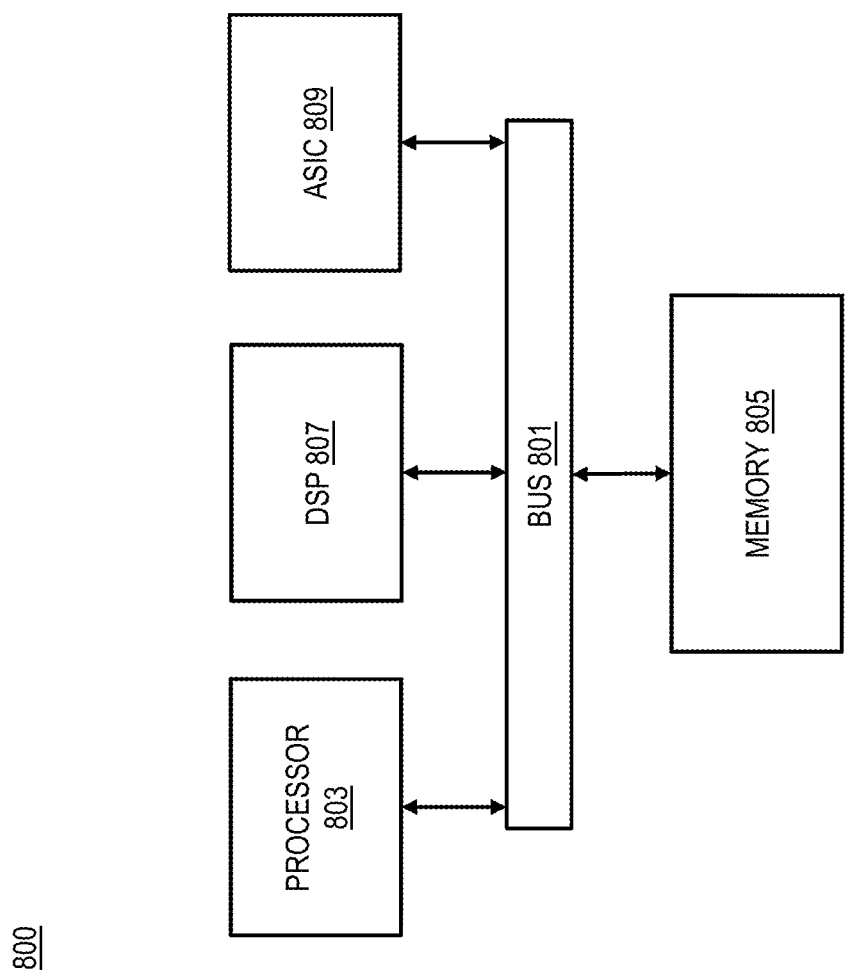
FIG. 8 is a diagram of a chip set that can be used to implement an embodiment of the invention.

FIG. 3 is a flowchart of an exemplary process for mixing at least one additional element on top of a media stream, according to one embodiment. In one embodiment, the mix media platform 103 performs the process 300 and is implemented in, for instance, a chip set including a processor and a memory as shown in FIG. 8. In step 301, the mix media platform 103 determines at least a first media item for rendering in a first application. By way of example, the first media item may include a music playlist or an Internet media stream (e.g., music, television, video, etc.) and the first application may include a media player application (e.g., the media player preinstalled on most mobile devices). In one example use case, an end user activates the media player on his or her mobile device (e.g., a mobile phone or tablet) in order to listen to a particular media stream (e.g., east coast hip hop). While the media player is still running, the user navigates away from the media player and starts one or more other applications on his or her mobile device (e.g., a mapping and/or navigation application).

In step 303, the mix media platform 103 determines one or more interactions with at least one connecting user interface element to associate a first representation of the first media item with a second representation of one or more media sources of a second application. By way of example, the at least one connecting user interface element consists of a virtual cable, which connects one or more individual patch bays (i.e., an input or an output) associated with the respective representations of the first application and the second application. It is contemplated that the one or more individual patch bays may function as a new type of user interface (UI) widget. It is further contemplated that the patch pay associated with the first media item of the first application and the one or more patch bays associated with the one or more media sources of the at least one second application are connected by the virtual cable in a manner similar to patching circuits in a patch bay found in a recording and/or production studio.

In step 305, the mix media platform 103 processes and/or facilitates a processing of the one or more interactions, the one or more media sources, or a combination thereof to cause, at least in part, an identification, a retrieval, or a combination thereof of the one or more second media items. By way of example, in the one example use case wherein the at least one second application is a location-based application, the mix media platform 103 determines a notification of a connection between the first application and the second application based on the association of the applications via the virtual cable. More specifically, the notification contains the GPS coordinates of the location to which the virtual cable is connected to (e.g., Harlem) and an address of a server (e.g., a server associated with the one or more content provisioning services) where the one or more media items (e.g., a drum loop) can be requested by the mix media platform 103 using the GPS coordinates of Harlem as a selection parameter. As previously discussed, it is contemplated that regardless of the type of the second application, the mix media platform 103 can determine the one or more selection parameters based, at least in part, on the location of the one or more patch bays associated with the second application.

In step 307, the mix media platform 103 causes, at least in part, a mixing of the first media item and at least a portion of one or more second media items associated with the one or more media sources to cause, at least in part, a generation of a mix item. For example, the mix media platform 103 mixes the at least first media item and the one or more second media items based, at least in part, on one or more beat matching, one or more tempo matching, one or more rhythm matching, or a combination thereof processes. More specifically, in one example use case, the mix media platform 103 may mix the media items based on beat and downbeat analysis methods such that the drum loop, for example, is (1) subjected to time-scale modification to make the drum loop tempo match the tempo of the active first media item and (2) time-aligned such that the first beat of each measure of the drum loop is matched to a downbeat of the first media item.

In step 309, the mix media platform 103 causes, at least in part, one or more renderings of the mix item based, at least in part, on the one or more second media items being mixed on top of the first media item. By way of example, the mix media platform 103 renders the mix item as a personalized media stream in the mobile device (e.g., mobile phone or tablet) of a user so that the user hears, for example, the Harlem drum loop on top of the east coast hip hop media stream previously activated on his or her mobile device.

In step 311, the mix media platform 103 optionally determines one or more other interactions with (a) one or more controls, one or more parameters, or a combination thereof associated with the first application; (b) the at least one connecting user interface element; or (c) a combination thereof to cause, at least in part, one or more modifications of the one or more rendering of the mix item. By way of example, the one or more controls may include one or more volume knob and the one or more parameters may include one or more features associated with a generic media player (e.g., repeat, shuffle, etc.). More specifically, in one example use case, the mix media platform 103 may cause, at least in part, a rendering of one or more volume knobs associated with the media player, the one or more patch bays, or a combination thereof. The mix media platform 103 can then process one or more manipulations of the one or more volume knobs to determine an input level of the one or more second media items (e.g., a drum loop) being mixed by the mix media platform 103 with the first media item (e.g., a music stream). In addition, the mix media platform 103 can enable the end user to make multiple connections between the first application (e.g., a media player) and the one or more second media items (e.g., a drum loop). However, if for example, the user simultaneously connects two drum loops to the media player, the mix media platform 103 may alternate the drum loops between one or more first media items (e.g., adjacent songs in a playlist) since it may not make sense to mix the two drum loops on top of each other.

In step 313, the mix media platform 103 optionally determines to store, to share, or a combination thereof the mix item. By way of example, the mix media platform 109 can determine to store one or more personalized mix items in the mix media database 109 based, at least in part, on one or more predetermined parameters (e.g., most popular, funniest, etc.). Further, the mix media platform 109 can determine to share the one or more mix items with one or more services (e.g., a social networking service). As a result, one or more other users can view, listen, rate, comment on, etc. the one or more mix items, which also may affect the manner in which the mix media platform 103 stores the one or more mix items in the mix media database 109.

In step 315, the mix media platform 103 optionally causes, at least in part, one or more associations of the stored, shared, or a combination thereof mix item with the first application. By way of example, the mix media platform 103 may determine to make the best and/or the funniest mix items automatically available in the media player for easy consumption.

Figure 4:
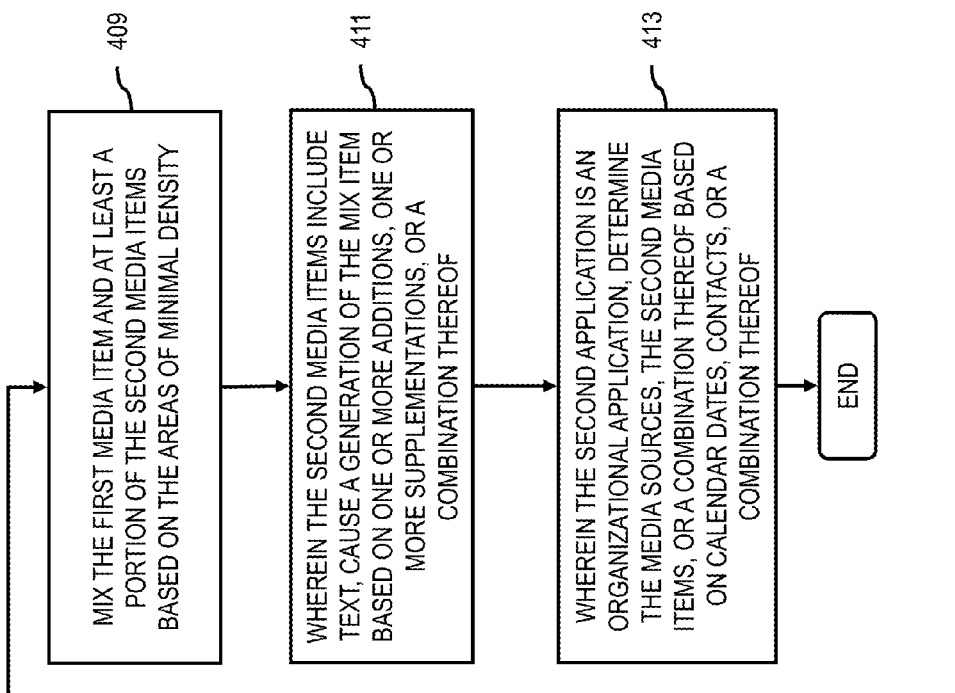
FIG. 4 is a flowchart of alternative processes for mixing at least one additional element on top of a media stream, according to various embodiments.

FIG. 4 is a flowchart of alternative processes for mixing at least one additional element on top of a media stream, according to various embodiments. In one embodiment, the mix media platform 103 performs the processes 400 and is implemented in, for instance, a chip set including a processor and a memory as shown in FIG. 8. In step 401, wherein in the second application is a location-based application, the mix media platform 103 determines the one or more media sources, the one or more second media items, or a combination thereof based, at least in part, on one or more geographic areas associated with the location-based application. As previously discussed, the mix media platform 103 can determine the one or second media items based, at least in part, on the GPS coordinates of a particular area (e.g., Harlem, Paris, Tokyo, etc.). More specifically, it is contemplated that the one or more second media items would have at least one recognizable and/or well-known association with a particular region (e.g., popularity in that area or region).

In step 403, wherein the second application is a social networking application, the mix media platform 109 determines at least one social networking status associated with one or more users of the social networking application. By way of example, the one or more statuses may include various types of input (e.g., text, mood, tags, images, etc.). In step 405, the mix media platform 109 causes, at least in part, at least one conversion of the at least one social networking status into at least a portion of the one or more second media items. In one example use case, the mix media platform 103 may synthesize text from a status update into singing using methods of singing synthesis, such as lyrics-to-singing synthesis (e.g., Songify®), and then mix the singing on top of a first media item (e.g., a music stream). As a result, a user would hear one or more of his or her friend's status updates sang along with the music stream. In addition to text, in certain embodiments, the mix media platform 103 can determine and select one or more media sources, one or more second media items (e.g., one or more virtual instruments), or a combination thereof based on the mood of a user of the social networking application (e.g., a sad mood). For example, if the mix media platform 103 determines a sad mood associated with a user, then the mix media platform 103 can select and mix chords in the minor key on top of the first media item (e.g., a music stream).

In step 407, wherein the first media item includes, at least in part, one or more graphical elements, the mix media platform 103 processes and/or facilitates a processing of the one or more graphical elements to determine one or more areas of minimal density. By way of example, the one or more graphical elements may include one or more video or television streams. In addition, in one embodiment, the mix media platform 103 determines the density of the one or more video or television streams based on one or more frame analysis methods. In step 409, the mix media platform 103 causes, at least in part, the mixing of the first media item and at least a portion of the one or more second media items based, at least in part, on the one or more areas of minimal density. More specifically, the mix media platform 109 mixes the first media item and the one or more second media items (e.g., one or more other images) so that the one or more other images do not mask interesting objects already in the video or television stream.

In step 411, wherein the one or more second media items includes, at least in part, text, the mix media platform 103 causes, at least in part, a generation of the mix item based, at least in part, on one or more additions of text, one or more supplementations with text, or a combination thereof on top of the first media item. In one example use case, the first media item may be pages of an electronic book and the one or more second media items may be associated with a word process application. As a result, the mix media platform 103 may determine to select text (e.g., a poem) from the word processing application, one or more databases (e.g., the mix media database 109) or a combination thereof in order to generate a personalized mix item comprising the poem interleaved into the pages of the electronic book. In another example use case, the first media item may be a media stream (e.g., a video or television stream) and the one or more second media items may be associated with text (e.g., lyrics of a song, lines of a movie, etc.). As a result, the mix media platform 103 may determine to mix the lyrics of a song or lines of a movie with the active media stream (e.g., as subtitles) in order to generate a personalized media stream.

In step 413, wherein the second application is an organizational application, the mix media platform 103 determines the one or more media sources, the one or more second media items, or a combination thereof based, at least in part, on one or more calendar dates, one or more contacts, or a combination thereof. By way of example, in one example use case, a user may navigate away from the active media player running on his or her mobile device (e.g., a mobile phone or tablet) in order to browse a calendar application for dates of holidays (e.g., Christmas). The mix media platform 103 can then determine to select one or more media sources, one or more second media items, or a combination thereof based on one or more Christmas themes and then mix the one or more second media items (e.g., sleigh bells) on top of the music stream to generate a personalized mix item.

Figure 5A:
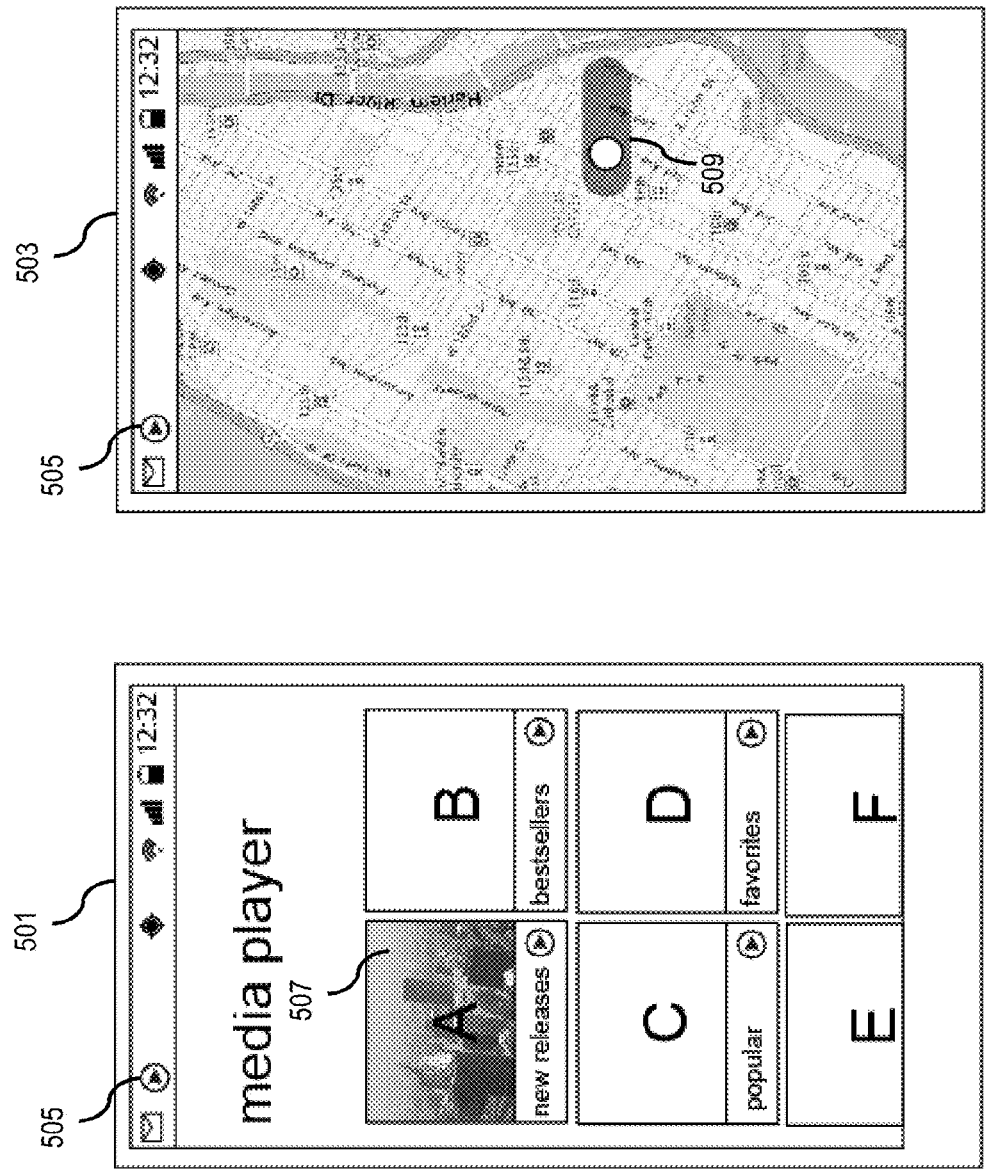
FIGS. 5A-5B are diagrams of user interfaces utilized in the exemplary processes of FIGS. 3 and 4, according to various embodiments.
Figure 5B:
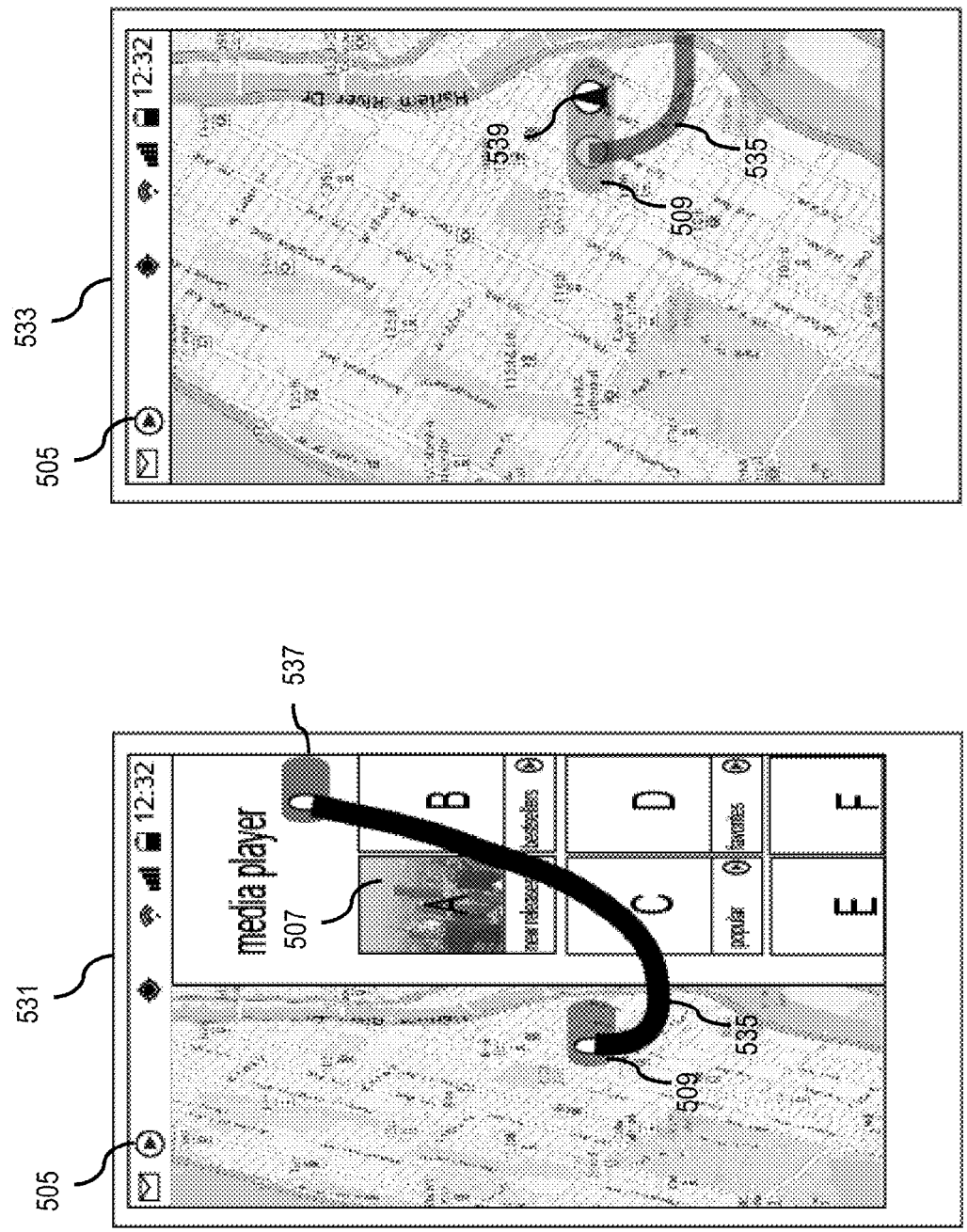

FIGS. 5A and 5B are diagrams of user interfaces utilized in the exemplary processes of FIGS. 3 and 4, according to various embodiments. As shown, the example user interfaces of FIGS. 5A and 5B include one or more user interface elements and/or functionalities created and/or modified based, at least in part, on information, data, and/or signals resulting from the processes (e.g., processes 300 and 400) described with respect to FIGS. 3 and 4. More specifically, FIG. 5A illustrates two user interfaces (e.g., interfaces 501 and 503) of a mobile device (e.g., a mobile phone) corresponding to a first application (e.g., a media player application) and a second application (e.g., a mapping and/or navigation application), respectively. In particular, interface 501 depicts an active media player application, as indicated by symbol 505, rendering music stream "A" (e.g., east coast hip hop) as indicated by image 507. In one example use case, while the media player is still running, a user can navigate away from the media player in interface 501 and start one or more media sources in a second application (e.g., a mapping and/or navigation application) as shown in interface 503. In particular, the end user may be curious about the origins of east coast hip hop and therefore want to look at a map of a portion of New York City (e.g., Harlem) as depicted in interface 503. In one embodiment, once the system 100 determines that the user is listening to a first media item (e.g., music stream "A"), the system 100 causes, at least in part, a rendering of one or more patch bays (e.g., patch bay 509) associated with the second application.

FIG. 5B illustrates two user interfaces (e.g., interfaces 531 and 533). In one embodiment, the system 100 next determines one or more interactions with one or more patch bays (e.g., patch bay 509), at least one connecting user interface element (e.g., a virtual cable 535), or a combination thereof to associate a first representation of the first media items (e.g., media stream "A") with a second representation of one or more media sources of a second application (e.g., a portion of a map of Harlem). More specifically, when the system 100 determines one or more interactions with the patch bay 509, the system 100 causes, at least in part, a rendering of the virtual cable 535 and the interface 531 changes to a mode that includes, at least in part, a rendering of the first application (e.g., the media player) with one or more patch bays (e.g., patch bay 537). As previously discussed, it is contemplated that the one or more individual patch bays may function as a new type of user interface (UI) widget. It is further contemplated that the patch bay associated with the first media item of the first application (e.g., patch bay 537) and the one or more patch bays associated with the one or more media sources of the second application (e.g., patch bay 509) are connected by the virtual cable 535 in a manner similar to patching circuits in a patch bay found in a recording and/or production studio.

In one embodiment, the system 100 then processes the one or more interactions, the one or more media sources (e.g., the map of Harlem), or a combination thereof to cause an identification, a retrieval, or a combination thereof of the one or more second media items (e.g., one or more drum loops, one or more audio samples, one or more virtual instruments, etc.) commonly associated with Harlem. More specifically, as a result of the association of the first and second applications via the virtual cable 535, the system 100 determines a notification of the connection from the mapping and/or navigation application, which contains the GPS coordinates of the location to which the virtual cable 535 is connected to (e.g., patch bay 509 corresponding to Harlem) and an address of a server (e.g., a server associated with one or more content provisioning services) where the one or more second media items (e.g., a drum loop) can by requested by the system 100 using the GPS coordinates of Harlem as a selection parameter.

In one embodiment, the system 100 next causes a mixing of the first media item (e.g., music stream "A") and at least a portion of the one or more second media items (e.g., the Harlem drum loop) to cause a generation of a mix item. More specifically, the system 100 mixes the at least first media item (e.g., music stream "A") and the one or more second media items (e.g., the Harlem drum loop) based, at least in part, one or more beat matching, one or more tempo matching, one or more rhythm matching, or a combination thereof processes. The system 100 then renders the mix media as a personalized media stream in the mobile device of the user so that the user hears the Harlem drum loop mixed on top of the east coast hip hop music stream "A".

In certain embodiments, as depicted in interface 533, once the system 100 generates and begins rendering the personalized media stream, the system 100 may determine one or more other interactions with (a) one or more controls (e.g., volume knob 539), one or more parameters (e.g., repeat, shuffle, etc.), or a combination thereof associated with the first application (e.g., the media player); (b) the at least one connecting user interface element (e.g., the virtual cable 535); or (c) a combination thereof to cause one or more modifications of the one or more renderings of the mix item. In one example use case, the system 100 may cause, at least in part, a rendering of one or more volume knobs (e.g., volume knob 539) associated with the media player, the one or more patch bays (e.g., as depicted in interface 533), or a combination thereof. The system 100 can then process one or more manipulations of the volume knob 539 to determine an input level of the one or more second media items (e.g., the Harlem drum loop) being mixed by the system 100 with the first media item (e.g., music stream "A"). In addition, in certain embodiments, the system 100 can determine to associate (i.e., make available) the one or more personalized mix items with one or more media streams (e.g., media streams "E" or "F"), the first application (e.g., media player), or a combination thereof. Further, it is contemplated that in one embodiment the patch bay 509 and the virtual cable 535 may be first rendered by the system 100 as partly transparent as depicted in interface 533, and then fade away completely.

FIG. 6 is a diagram of user interfaces utilized in one or more alternative processes of FIGS. 3 and 4, according to various embodiments. As shown, the example user interfaces of FIG. 6 include one or more user interface elements and/or functionalities created and/or modified based, at least in part, on information, data, and/or signals resulting from the processes (e.g., processes 300 and 400) described with respect to FIGS. 3 and 4. More specifically, FIG. 6 illustrates two user interfaces (e.g., interfaces 601 and 603) of a mobile device (e.g., a mobile phone). In particular, interface 601 depicts an example use case wherein the second application is a social networking application (e.g., Facebook®). As previously discussed with respect to FIGS. 5A and 5B, in this example use case, a user has also already started a first application (e.g., a media player application) as indicated by symbol 605. Again, the user may be listening to a first media item (e.g., music stream "A") and while the media player is still running, the user can navigate away from the media player and start one or more media sources in a second application (e.g., a social networking application) as depicted in interface 601.

In one embodiment, once the system 100 determines that the user is listening to a first media item (e.g., music stream "A"), the system 100 causes, at least in part, a rendering of one or more patch bays (e.g., patch bays 607 and 609) associated with the second application. More specifically, patch bay 607 corresponds to the written status posted by the user "ABC" and patch bay 609 corresponds to the overall mood of the user "ABC" (e.g., sad). In one embodiment, the system 100 next determines one or more interactions with the one or more patch bays (e.g., patch bay 607) in order to cause, at least in part, a rending of a virtual cable (e.g., virtual cable 611). In addition, the interface 603 changes to a mode that includes, at least in part, a rendering of the first application (e.g., the media player) with one or more patch bays (e.g., patch bay 613). In one embodiment, the system 100 then processes the one or more interactions, the one or more media sources (e.g., a user's homepage), or a combination thereof to cause an identification, a retrieval, or a combination thereof of the one or more second media items (e.g., one or more drum loops, one or more audio samples, one or more virtual instruments, etc.) associated with the second application.

In particular, in certain embodiments, wherein the second application is a social networking application, the system 100 first determines at least one social networking status associated with one or more users of the social networking application (e.g., user "ABC"). By way of example, the one or more statuses may include various types of input (e.g., text, mood, tags, images, etc.). In one embodiment, as a result of the association of the first and second applications via the virtual cable 611, the system 100 determines a notification of the connection from the social networking application, which contains the location to which the virtual cable 611 is connected (e.g., patch pay 607). In one embodiment, based on the location to which the virtual cable 611 is connected (e.g., patch bay 607) the system 100 then causes at least one conversion of the at least one social networking status into at least a portion of the one or more second media items. By way of example, the system 100 may synthesize text from a status update (e.g., "bad day today, relationship just ended, so sad!") into singing using methods of singing synthesis, such as lyrics-to-singing synthesis (e.g., Songify®), and then mix the singing on top of the first media item (e.g., music stream "A"). In another use case example, if the location to which the virtual cable 611 is connected to is patch bay 609, the system 100 can determine and select one or more media sources, one or more second media items (e.g., one or more virtual instruments), or a combination thereof based on the mood of the user "ABC". For example, if the system 100 determines a sad mood for user "ABC", then the system 100 can select and mix chords in the minor key on top of the first media item (e.g., music stream "A") to cause a generation of a mix item. The system 100 then renders the mix item as a personalized media stream in the mobile device associated with interface 603 so that the user hears synthesized text or chords in the minor key mix on top of the music stream "A".

The processes described herein for mixing at least one additional element on top of a media stream may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
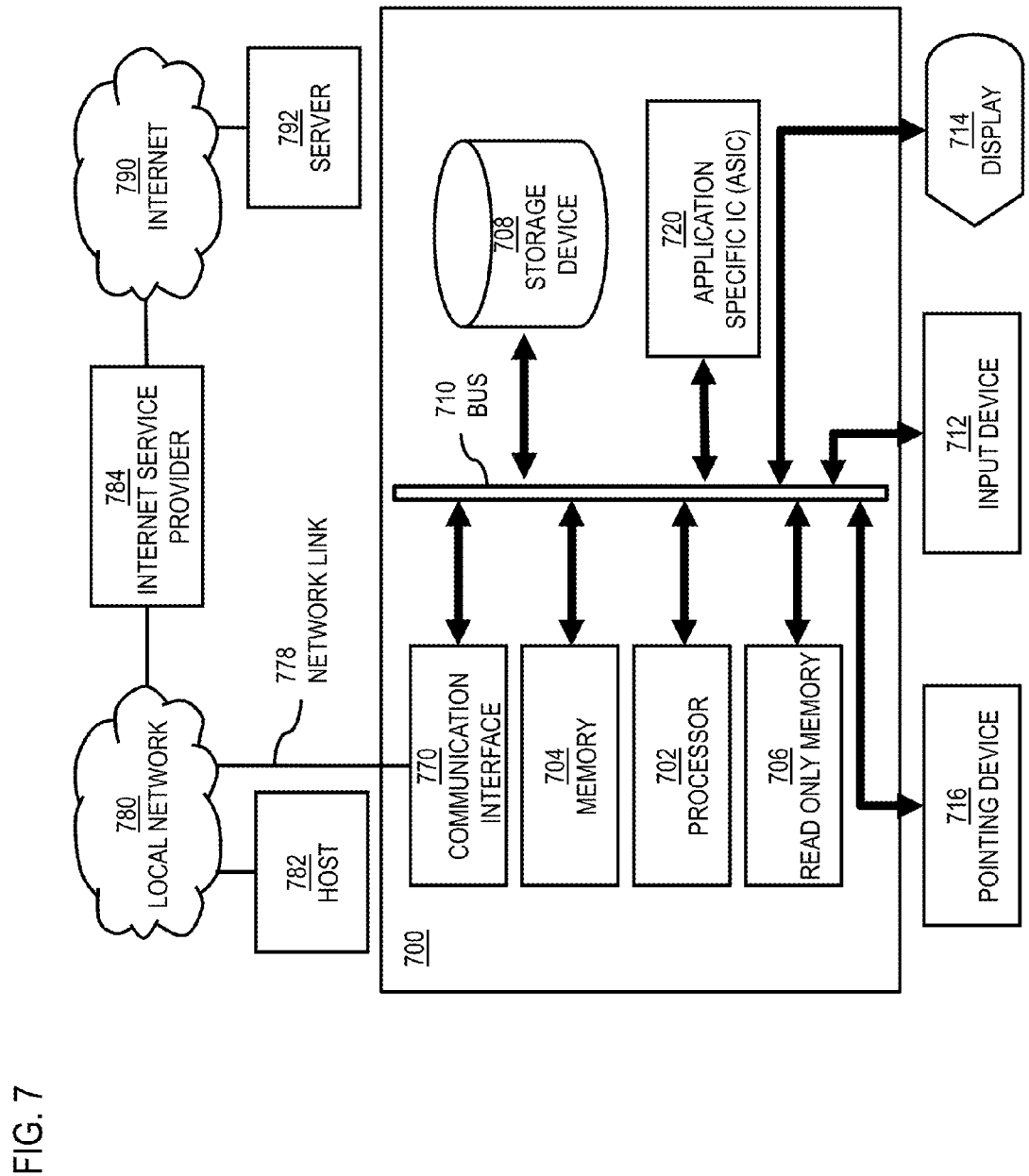
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions)

to mix at least one additional element on top of a media stream as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of mixing at least one additional element on top of a media stream.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to mix at least one additional element on top of a media stream. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for mixing at least one additional element on top of a media stream. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for mixing at least one additional element on top of a media stream, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for mixing at least one additional element on top of a media stream to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to mix at least one additional element on top of a media stream as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of mixing at least one additional element on top of a media stream.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to mix at least one additional element on top of a media stream. The memory 805 also stores the data associated with or generated by the execution of the inventive steps.

Figure 9:
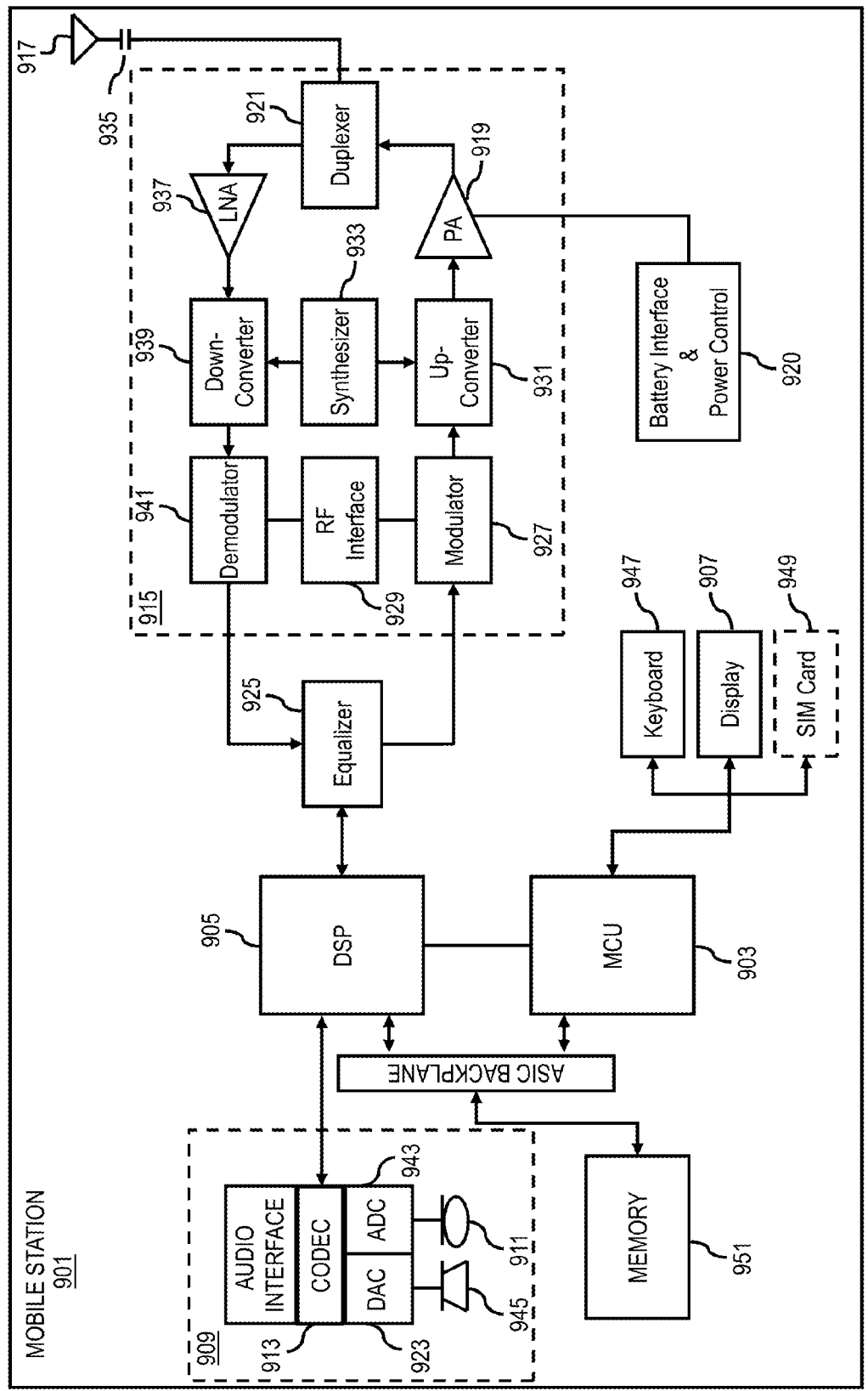
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of mixing at least one additional element on top of a media stream. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of mixing at least one additional element on top of a media stream. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to mix at least one additional element on top of a media stream. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

processing at least one first patch bay associated with an input, an output or a combination thereof of at least a portion of one or more first media items associated with one or more first media sources for rendering in a first application;

rendering the at least one first patch bay within the at least a portion of the one or more first media items in the first application;

determining at least one second patch bay associated with an input, an output or a combination thereof of at least a portion of one or more second media items associated with one or more second media sources for rendering in a second application, wherein the second application is a social networking application;

determining at least one social networking status associated with one or more users of the social networking application;

converting the at least one social networking status into at least a portion of the one or more second media items;

rendering the at least one second patch bay within the at least a portion of the one or more second media items in the second application;

associating at least one first patch bay and the at least one second patch bay with a connecting user interface element;

rendering of the connecting user interface element connecting the at least one first patch bay and the at least one second patch bay; and mixing the one or more first media items and the one or more second media items to cause, at least in part, a generation of a mix item, wherein the mixing includes associating one or more parameters associated with at least one first media item with at least one second media item, and wherein the mix item includes the one or more parameters associated in the mixing.

2. The method of claim 1, further comprising:

determining one or more interactions associated with the connecting user interface element to associate a first representation of the one or more first media items with a second representation of the one or more second media items; and processing the one or more interactions, the one or more media sources, or a combination thereof to cause, at least in part, an identification, a retrieval, or a combination thereof of the one or more second media items.

3. The method of claim 1, further comprising:

determining the one or more media sources, the one or more second media items, or a combination thereof based, at least in part, on one or more geographic areas associated with the location-based application, wherein the second application is a location-based application.

4. The method of claim 1, further comprising:
one or more renderings of the mix item based, at least in part, on the one or more second media items being mixed on top of the first media item.

5. The method of claim 1, further comprising:
processing the one or more graphical elements to determine one or more areas of minimal density; and
mixing the first media item and at least a portion of the one or more second media items based, at least in part, on the one or more areas of minimal density,
wherein the first media item includes, at least in part, one or more graphical elements.

6. The method of claim 1, further comprising:
generating the mix item based, at least in part, on one or more additions of text, one or more supplementations with text, or a combination thereof on top of the first media item,
wherein the one or more second media items include, at least in part, text.

7. The method of claim 1, further comprising:
determining the one or more media sources, the one or more second media items, or a combination thereof based, at least in part, on one or more calendar dates, one or more contacts, or a combination thereof,
wherein the second application is an organizational application.

8. The method of claim 4, further comprising:
determining one or more other interactions with (a) one or more controls, one or more parameters, or a combination thereof associated with the first application; (b) the at least one connecting user interface element; or (c) a combination thereof to cause, at least in part, one or more modifications of the one or more rendering of the mix item.

9. The method of claim 1, further comprising:
storing, sharing, or a combination thereof the mix item; and
associating the stored, shared, or a combination thereof mix item with the first application.

10. An apparatus comprising:
at least one processor; and
at least one memory including computer program code for one or more programs,
the at least one memory and the computer program code configured to, with the at least one processor, cause the apparatus to perform at least the following:
determine at least one first patch bay associated with an input, an output or a combination thereof at least a portion of one or more first media items associated with one or more first media sources for rendering in a first application,
render the at least one first patch bay within the at least a portion of the one or more first media items in the first application,
determine at least one second patch bay associated with an input, an output or a combination thereof of at least a portion of one or more second media items associated with one or more second media sources for rendering in a second application, wherein the second application is a social networking application;
determine at least one social networking status associated with one or more users of the social networking application,
convert the at least one social networking status into at least a portion of the one or more second media items,
render the at least one second patch bay within the at least a portion of the one or more second media items in the second application,
determine a connecting user interface element to associate the at least one first patch bay and the at least one second patch bay,
render the connecting user interface element connecting the at least one first patch bay and the at least one second patch bay, and
mixing the one or more first media items and the one or more second media items to cause, at least in part, a generation of a mix item,
wherein the mixing includes associating one or more parameters associated with at least one first media item with at least one second media item, and wherein the mix item includes the one or more parameters associated in the mixing.

11. The apparatus of claim 10, wherein the apparatus is further caused to:
determine one or more interactions associated with the connecting user interface element to associate a first representation of the one or more first media items with a second representation of the one or more second media items,
processing the one or more interactions, the one or more media sources, or a combination thereof to cause, at least in part, an identification, a retrieval, or a combination thereof of the one or more second media items.

12. The apparatus of claim 10, wherein the second application is a location-based application and wherein the apparatus is further caused to:
determine the one or more media sources, the one or more second media items, or a combination thereof based, at least in part, on one or more geographic areas associated with the location-based application.

13. The apparatus of claim 10, wherein the apparatus is further caused to:
one or more renderings of the mix item based, at least in part, on the one or more second media items being mixed on top of the first media item.

14. The apparatus of claim 10, wherein the first media item includes, at least in part, one or more graphical elements and wherein the apparatus is further caused to:
processing the one or more graphical elements to determine one or more areas of minimal density, and
mixing the first media item and at least a portion of the one or more second media items based, at least in part, on the one or more areas of minimal density.

15. The apparatus of claim 10, wherein the one or more second media items include, at least in part, text and wherein the apparatus is further caused to:
generating the mix item based, at least in part, on one or more additions of text, one or more supplementations with text, or a combination thereof on top of the first media item.

16. The apparatus of claim 10, wherein the second application is an organizational application and wherein the apparatus is further caused to:
determine the one or more media sources, the one or more second media items, or a combination thereof based, at least in part, on one or more calendar dates, one or more contacts, or a combination thereof.

17. The apparatus of claim 13, wherein the apparatus is further caused to:
determine one or more other interactions with (a) one or more controls, one or more parameters, or a combination thereof associated with the first application; (b) the at least one connecting user interface element; or (c) a combination thereof to cause, at least in part, one or more modifications of the one or more rendering of the mix item.

18. The apparatus of claim 10, wherein the apparatus is further caused to:
store, share, or a combination thereof the mix item, and associating the stored, shared, or a combination thereof mix item with the first application.

* * * * *